United States Patent
Rajasingam et al.

(10) Patent No.: US 10,245,761 B2
(45) Date of Patent: Apr. 2, 2019

(54) MOULD FOR A WIND TURBINE COMPONENT

(71) Applicant: Vestas Wind Systems A/S, Aarhus N. (DK)

(72) Inventors: Damien Rajasingam, East Cowes (GB); Diego Andres Pino, Lem St. (DK); Olav Davis, Hamble (GB)

(73) Assignee: Vestas Wind Systems A/S, Aarhus N. (DK)

( * ) Notice: Subject to any disclaimer, the term of this patent is extended or adjusted under 35 U.S.C. 154(b) by 339 days.

(21) Appl. No.: 14/909,274

(22) PCT Filed: Aug. 1, 2014

(86) PCT No.: PCT/DK2014/050233
§ 371 (c)(1),
(2) Date: Feb. 1, 2016

(87) PCT Pub. No.: WO2015/014371
PCT Pub. Date: Feb. 5, 2015

(65) Prior Publication Data
US 2016/0193752 A1    Jul. 7, 2016

(30) Foreign Application Priority Data
Aug. 2, 2013  (DK) .................................. 2013 70423

(51) Int. Cl.
*B29C 33/38*    (2006.01)
*B29C 70/34*    (2006.01)
(Continued)

(52) U.S. Cl.
CPC .......... *B29C 33/3828* (2013.01); *B29C 33/02* (2013.01); *B29C 70/34* (2013.01);
(Continued)

(58) Field of Classification Search
CPC ..... B29C 70/34; B29C 70/42; B29C 33/3828; B29L 2031/085
(Continued)

(56) References Cited

U.S. PATENT DOCUMENTS 4,105,184 A * 8/1978 Sumitomo .............. B29C 33/04
                                                          249/111
5,358,211 A * 10/1994 Sterett .................... B29C 33/02
                                                          249/111
(Continued)

FOREIGN PATENT DOCUMENTS

CA    2864465 A1 *  8/2013  ............. F03D 1/065
CN    202174667 U    3/2012
(Continued)

OTHER PUBLICATIONS

Danish Patent and Trademark Office, Search Report issued in Application No. PA 2013 70423 dated Mar. 12, 2014.
(Continued)

*Primary Examiner* — Robert B Davis
(74) *Attorney, Agent, or Firm* — Wood Herron & Evans LLP

(57) ABSTRACT

A mold (30) for a wind turbine component (10) is described. The component comprises a plurality of elements having different respective heat capacities. The mold comprises an inner mold layer (38) defining a mold surface (40) for supporting the plurality of elements, heating means (44) disposed beneath the mold surface, and a heat distribution layer (46) adjacent to the heating means. The mold has one or more first regions (34) configured to support elements of the component having relatively high heat capacity, one or more second regions (36) configured to support elements of the component having relatively low heat capacity, and one or more transition regions (35) defined between the first and second regions. The heat distribution layer in one or more
(Continued)

transition regions of the mold is configured to enhance heat transfer within the distribution layer to one or more first regions of the mold.

33 Claims, 5 Drawing Sheets

(51) Int. Cl.
  *B29C 70/42* (2006.01)
  *B29C 33/02* (2006.01)
  *B29D 99/00* (2010.01)
  *F03D 1/06* (2006.01)
  *B29L 31/08* (2006.01)
  *B29K 105/08* (2006.01)
  *B29K 307/04* (2006.01)

(52) U.S. Cl.
  CPC ....... *B29D 99/0025* (2013.01); *F03D 1/0675* (2013.01); *B29K 2105/0872* (2013.01); *B29K 2307/04* (2013.01); *B29K 2905/02* (2013.01); *B29K 2995/0013* (2013.01); *B29L 2031/085* (2013.01); *Y02E 10/721* (2013.01); *Y02P 70/523* (2015.11)

(58) Field of Classification Search
  USPC .......................................................... 249/111
  See application file for complete search history.

(56) References Cited

U.S. PATENT DOCUMENTS

2002/0150645 A1* 10/2002 Covino .................. B22C 9/061
                                                                425/182
2010/0140448 A1    6/2010 Koerwien
2011/0198013 A1*   8/2011 Christiansen .......... B29C 33/02
                                                                 156/64

FOREIGN PATENT DOCUMENTS

JP    H04239612 A    8/1992
JP    H05278039 A   10/1993
WO    2011029274 A1  3/2011
WO    2012133406 A1 10/2012

OTHER PUBLICATIONS

European Patent Office, International Search Report and Written Opinion issued in International Application No. PCT/DK2014/050233 dated Nov. 26, 2014.

* cited by examiner

MOULD FOR A WIND TURBINE COMPONENT

FIELD OF THE INVENTION

The present invention relates generally to a mould for a wind turbine component, and to a method of making such a mould. In particular, although not exclusively, the invention relates to a mould for a rotor blade of a wind turbine.

BACKGROUND TO THE INVENTION

FIG. 1 illustrates in cross-section a typical wind turbine rotor blade 10. The rotor blade 10 comprises an outer shell 12 that is fabricated from first and second half shells 14, 16. The half shells 14, 16 are laminated structures that are moulded from glass-fibre reinforced plastic (GRP). Each half shell 14, 16 comprises inner and outer skins 20, 18 with structural reinforcing elements such as longitudinally-extending spar caps 22 (also referred to as beams, bearing structures, girders etc) formed from pultruded strips of carbon fibre reinforced plastic (CFRP) arranged between the inner and outer skins 20, 18. Foam panels 24 forming sandwich panel cores typically fill the gaps between the structural elements.

The half shells 14, 16 are moulded in separate mould halves 25, an example of which is illustrated in plan view in FIG. 2. Once each half shell 14, 16 has been moulded, the two half shells 14, 16 are brought together by closing the mould, and the half shells 14, 16 are bonded together to form the complete blade 10.

To form a half shell 14, 16, one or more outer dry glass-fibre cloth layers are placed on a mould surface of the mould half 25. These layers will later form the outer skin 18 of the blade. Structural elements, including the spar caps 22 and the foam panels 24, are then laid up on the cloths. One or more inner dry glass-fibre cloth layers are then placed over the structural elements, and these will later form the inner skin 20 of the blade.

Next, the elements of the half shell 14, 16 are covered with an airtight bag to form an evacuation chamber encapsulating all of the elements. The chamber is evacuated and a supply of liquid resin is connected to the chamber. The resin is introduced into the mould half 25 and infused through and between the elements.

Once the resin has been infused, the assembly undergoes a curing cycle to harden the resin, during which time the mould assembly 25 is heated. The assembly 25 may be heated by external heating elements, or alternatively heating elements may be embedded in the mould to provide a heatable mould.

In such heatable moulds, it is known to provide a heat distribution layer. For example, U.S. Pat. No. 3,387,333, describes a metallic layer arranged between the heating elements and the mould surface which distributes heat from the heating elements uniformly across the mould surface to ensure even heating of the half shell.

However, the half shell 14, 16 comprises different elements which, being made of different materials and/or having different thicknesses, have different heat capacities. In particular, carbon-containing elements, such as the spar caps 22, have a relatively high heat capacity, while other elements, such as the foam panels 24 between the carbon elements, have a relatively low heat capacity.

To cure the resin fully, the mould 25 must be heated until all the elements of the half shell 14, 16 have reached a required curing temperature $T_{cure}$. This curing temperature is the temperature that is required to cure the resin, and is typically between approximately 60° C. and approximately 120° C. It will be appreciated that the spar caps 22, having high heat capacity, require more energy to reach the curing temperature than the foam panels 24, which have a low heat capacity. Excess heat energy is therefore supplied to the foam panels 24 causing them to overheat as the spar caps 22 are brought up to the curing temperature. The curing process is therefore energy inefficient. Furthermore, in extreme cases, the foam panels 24 may exceed a maximum safe exposure temperature $T_{max}$, (between approximately 120° C. and approximately 150° C.), which may damage the foam panels 24, and compromise the structural integrity of the blade 10.

This problem can be mitigated to some extent by providing a plurality of heating control zones 26 within the mould 25, as illustrated in FIG. 2. Each heating control zone 26 comprises a heating element that can be independently controlled, so that more heat energy is supplied to some heating control zones 26 than others. Areas of higher heat capacity can therefore be supplied with more heat than those of lower heat capacity. However, the control systems required for independent control of each heating control zone 26 are costly, and the greater the number of heating control zones 26, the higher the cost of the mould 25. The resolution of heating control zones 26 is therefore limited by cost, and typically a control zone 26 must be several square meters in area. In practice, a single control zone 26 must therefore support several elements of varying heat capacity. Thus it is not practical to use heating control zones 26 to eliminate altogether the problem of excess heat being supplied to elements of low heat capacity, such as the foam panels 24.

Against this background, it is an object of the present invention to provide a cost-efficient mould for a wind turbine component that addresses or mitigates the above problem.

SUMMARY OF THE INVENTION

From a first aspect, the invention resides in a mould for a wind turbine component. The component comprises a plurality of elements having different respective heat capacities. The mould comprises an inner mould layer defining a mould surface for supporting the plurality of elements, heating means disposed beneath the mould surface, and a heat distribution layer adjacent to the heating means. The mould has one or more first regions configured to support elements of the component having relatively high heat capacity, one or more second regions configured to support elements of the component having relatively low heat capacity, and one or more transition regions defined between the first and second regions. The heat distribution layer in one or more transition regions of the mould is configured to enhance heat transfer within the distribution layer to one or more first regions of the mould.

By the terms "elements of the component having relatively high heat capacity" and "elements of the component having relatively low heat capacity" it is meant that the elements of the component having relatively high heat capacity have a heat capacity that is higher than the elements of the component having relatively low heat capacity.

As noted above the elements of the component having relatively high heat capacity may be the carbon-containing elements such as spar caps, formed for example of carbon-fibre pultrusions. The relatively low heat capacity elements may be foam elements, such as foam panels.

The invention provides a mould in which heat provided by the heating means is conducted to the heat distribution layer by virtue of its proximity to the heat distribution layer. Heat is conducted within the heat distribution layer to promote fast heating of the mould. Furthermore, by virtue of the configuration of the heat distribution layer in one or more transition regions of the mould, there is a relatively high net flow of heat within the mould across the transition regions to the first regions, as will now be described.

The elements of relatively high heat capacity act as heat sinks and absorb more heat than the elements of relatively low heat capacity. Heat therefore flows from the elements of relatively low heat capacity to the elements of relatively high heat capacity, and hence flows from the second regions of the mould to the first regions of the mould. In the mould of the present invention, this heat flow is facilitated by the configuration of the heat distribution layer in the transition region(s) of the mould.

In a mould according to the invention, heat therefore flows towards the elements of greater heat capacity that are supported by the first regions of the mould more quickly than in conventional moulds. Overheating of the elements of lower heat capacity is thereby avoided, and more heat flows towards the elements of high heat capacity, where it is needed most. The component therefore undergoes more efficient heating during the curing process, and the mould requires less energy for curing than conventional moulds.

When the mould is in use, the transition region(s) of the mould preferably lie beneath a boundary between an element of the component of relatively high heat capacity and an element of the component of relatively low heat capacity.

Preferably, the heat distribution layer is of greater thermal conductivity and/or is of greater thickness and/or has a higher mesh density in one or more transition regions of the mould than in one or more second regions of the mould.

Throughout this description, the mesh density of a mesh layer is taken as meaning the proportion of the mesh layer that is taken up by solid material, as opposed to empty space, expressed as a fraction or as a percentage.

Whilst the heat distribution layer is a mesh layer in embodiments where the mesh density is greater in the transition regions of the mould than in the second regions of the mould, in other embodiments, for example where the thermal conductivity and/or thickness are varied, this need not be the case, and the heat distribution layer may be a solid layer. Preferably, however, the heat distribution layer is a mesh layer as this facilitates resin infusion throughout the mould when the mould is manufactured, and is less expensive than a solid layer. It will be appreciated that in some embodiments, any combination of the thermal conductivity, thickness and/or mesh density may be greater in one or more transition regions of the mould than in one or more second regions of the mould.

In embodiments where the heat distribution layer is of greater thermal conductivity in the transition region(s) than in the second region(s), the higher thermal conductivity results in a greater rate of heat flow across the heat distribution layer in the transition region(s) towards the first region(s) of the mould. In embodiments where the heat distribution layer is of greater thickness and/or is a mesh of greater mesh density in the transition region(s) than in the second region(s), a cross-sectional area of the heat distribution layer perpendicular to the heat flow direction is greater in the transition region(s) than in the second region(s). This greater cross-sectional area results in a greater rate of heat flow across the heat distribution layer in the transition region(s) towards the first region(s) of the mould.

Thus, by virtue of the configuration of the heat distribution layer in the transition region(s), heat is conducted quickly across the transition region(s), and heat flow from the second region(s) to the first region(s) is enhanced compared to a conventional mould having a uniform heat distribution layer.

For particular ease of manufacture, the heat distribution layer may be of greater thermal conductivity and/or may be of greater thickness and/or may have a higher mesh density in one or more of the first regions of the mould than in one or more of the second regions of the mould. In this case, the heat distribution layer is of substantially the same thermal conductivity and/or is of substantially the same thickness and/or has substantially the same mesh density in one or more first regions of the mould and in one or more transition regions of the mould.

In particularly preferred embodiments, the mould comprises a plurality of heating control zones, each heating control zone comprising a separately controllable heating means, and a first region, a second region and a transition region of the mould are located in the same heating control zone.

For simple control of the thickness of the heat distribution layer, and to facilitate the manufacturing process of the mould, the heat distribution layer may comprise a plurality of sub-layers. In particular, the heat distribution layer may comprise a greater number of sub-layers in one or more transition regions of the mould than in one or more second regions of the mould.

Preferably, the heat distribution layer comprises one or more mesh layers. In this way, resin can easily diffuse within and around the heat distribution layer via the open spaces in the mesh.

The heat distribution layer may be made at least partially of aluminium, to provide a compromise between relatively high thermal conductivity and relatively low cost. However, other suitable thermally conducting materials may be used. Embodiments are envisaged in which, for example, the heat distribution layer is made of copper in the transition region and made of aluminium elsewhere.

Preferably, the heating means are electrical heating elements. In alternative embodiments, the heating means may be in the form of pipes that circulate heated fluid such as water or oil to heat the mould.

For cost-efficiency, the mould may comprise one or more further regions in which the heat distribution layer is not present.

The component may be a wind turbine blade, such that the mould is a mould for a wind turbine blade.

The elements of the component of relatively high heat capacity may be made of a carbon-containing material. These elements may be, for example, longitudinally-extending reinforcement members.

The elements of the component having relatively low heat capacity may be relatively lightweight core materials such as, for example, foam and/or balsa elements. These elements may be sandwich panel cores.

From another aspect, the invention resides in a mould for a wind turbine component. The component comprises a plurality of elements having different respective heat capacities. The mould comprises an inner mould layer defining a mould surface for supporting the plurality of elements, heating means disposed beneath the mould surface, and a heat distribution layer adjacent to the heating means. The mould has one or more first regions configured to support elements of the component having relatively high heat capacity, one or more second regions configured to support elements of the component having relatively low heat capacity, and one or more transition regions defined between the first and second regions. The heat distribution layer is of greater thermal conductivity and/or is of greater thickness and/or has a higher mesh density in one or more transition regions of the mould than in one or more second regions of the mould.

According to a further aspect, the invention resides in a method of making a mould for a wind turbine component. The component comprises a plurality of elements having different respective heat capacities. The mould has one or more first regions configured to support elements of the component having relatively high heat capacity, one or more second regions configured to support elements of the component having relatively low heat capacity, and one or more transition regions defined between the first and second regions. The method comprises a) providing a master plug defining an outer surface, b) arranging fibrous material over the outer surface of the master plug to form an inner mould layer of the mould c) arranging a heating means and a heat distribution layer over the fibrous material, the heat distribution layer in a transition region of the mould being configured to enhance heat transfer within the distribution layer to a first region of the mould, d) integrating the inner mould layer, the heating means and the heat distribution layer to form the mould, and e) separating the mould from the master plug.

The heat distribution layer may be of greater thermal conductivity and/or may be of greater thickness and/or may have a higher mesh density in one or more transition regions of the mould than in one or more second regions of the mould.

The heat distribution layer may be of greater thermal conductivity and/or may be of greater thickness and/or may have a higher mesh density in the first regions of the mould than in the second regions of the mould. In this case, for particular ease of manufacture, the heat distribution layer may be of substantially the same thermal conductivity and/or may be of substantially the same thickness and/or may have substantially the same mesh density in one or more first regions of the mould and in one or more transition regions of the mould.

In preferred embodiments, and for particularly fine control of the heating of the mould, the method may comprise arranging a plurality of separately controllable heating means over the fibrous material, each heating means defining a heating control zone of the mould. In this case, the method may comprise arranging the heat distribution layer such that a first region, a second region and a transition region are located in the same heating control zone.

Preferably, the method further comprises supplying resin to the fibrous material between steps (b) and (c) in a resin infusion process. The method may also comprise heating the inner mould layer between steps (b) and (c) to cure the resin.

For ease of manufacture, the heat distribution layer may comprise a plurality of sub-layers arranged on top of one another, and the method may comprise arranging more sub-layers on the fibrous material in one or more of the transition regions than in one or more of the second regions.

Step (f) may comprise supplying resin to the layers in a resin infusion process. Step (f) may alternatively or additionally comprise heating the layers to cure the resin. In this case, the layers may be heated using the heating means.

From another aspect, the invention resides in a method of making a mould for a wind turbine component. The component comprises a plurality of elements having different respective heat capacities. The mould has one or more first regions configured to support elements of the component having relatively high heat capacity, one or more second regions configured to support elements of the component having relatively low heat capacity, and one or more transition regions defined between the first and second regions. The method comprises a) providing a master plug defining an outer surface, b) arranging fibrous material over the outer surface of the master plug to form an inner mould layer of the mould c) arranging a heating means and a heat distribution layer over the fibrous material, the heat distribution layer being of greater thermal conductivity and/or being of greater thickness and/or having a higher mesh density in at least one transition region of the mould than in at least one second region of the mould, d) integrating the inner mould layer, the heating means and the heat distribution layer to form the mould, and e) separating the mould from the master plug.

The invention also extends to a mould for a wind turbine component made according to the method described above.

From another aspect, the invention resides in a method of making a component for a wind turbine using the mould described above. The method comprises: arranging one or more first elements of the component having relatively high heat capacity in one or more first regions of the mould; arranging one or more second elements of the component having relatively low heat capacity in one or more second regions of the mould; forming a sealed region around the elements; reducing a pressure in the sealed region; optionally, supplying resin to the sealed region; and heating the mould using the heating means to cause a net heat flow towards the first elements of the component, wherein the heat flow towards one or more of the first elements is enhanced by the configuration of the heat distribution layer in one or more transition regions of the mould.

In preferred embodiments, the component is a wind turbine blade.

From still another aspect, the invention resides in a method of making a component for a wind turbine using the mould described above. The method comprises: arranging one or more first elements of the component having relatively high heat capacity in one or more first regions of the mould; arranging one or more second elements of the component having relatively low heat capacity in one or more second regions of the mould; forming a sealed region around the elements; reducing a pressure in the sealed region; optionally, supplying resin to the sealed region; and heating the mould using the heating means to cause a net heat flow towards the first elements of the component, wherein the heat flow towards one or more of the first elements is enhanced by the heat distribution layer of the mould, which is of greater thermal conductivity and/or is of greater thickness and/or has a higher mesh density in one or more transition regions of the mould between the first and second regions, than in one or more second regions of the mould.

The invention also extends to a wind turbine component made using the mould described above, or according to the method described above.

Preferred and/or optional features of any aspect of the invention may also be used, alone or in appropriate combination, with the other aspects of the invention also.

BRIEF DESCRIPTION OF THE DRAWINGS

Reference has already been made to FIG. 1, which illustrates in cross section a wind turbine rotor blade and FIG. 2, which is a plan view of a conventional mould for a wind turbine component. In order that the invention may be more readily understood, reference will now be made, by way of example only, to the remainder of the drawings, in which.

DETAILED DESCRIPTION OF EMBODIMENTS OF THE INVENTION

Figure 1:
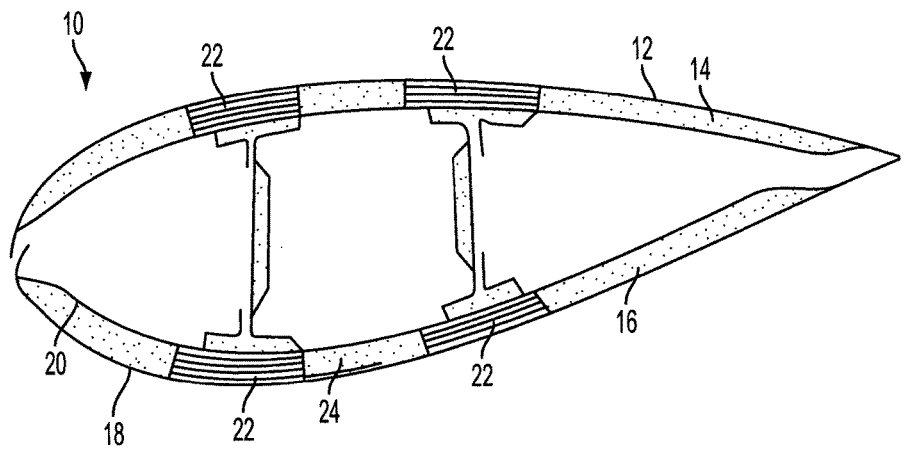

The invention relates to a mould 30 for making a wind turbine rotor blade 10 of the sort shown in FIG. 1. The rotor blade 10 comprises a plurality of elements having different heat capacities, in this case, and referring to FIG. 1, spar caps 22, that are made from carbon pultrusions and have a relatively high heat capacity, and sandwich panel cores that are made from lightweight foam panels 24, and have a relatively low heat capacity. A boundary 23 is defined at the interface between adjacent spar caps 22 and foam panels 24.

Figure 2:
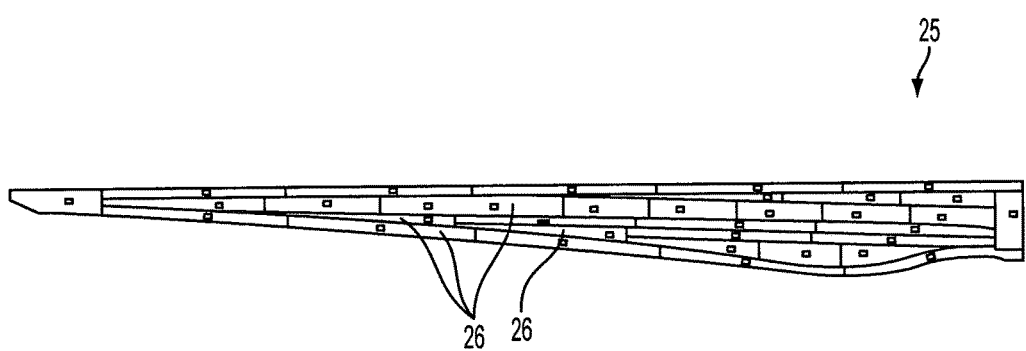

The mould 30 is divided into heating control zones 26, of the type illustrated in FIG. 2. Within a heating control zone 26, the mould 30 is divided into mould regions 32. First regions 34 of the mould 30 are configured to support the longitudinally-extending spar caps 22 of the blade 10 during moulding. Second regions 36 of the mould 30 are configured to support the foam panels 24 of the sandwich panel cores during moulding. A transition region 35 is defined between the first regions 34 and the second regions 36 of the mould 30.

Figure 3:
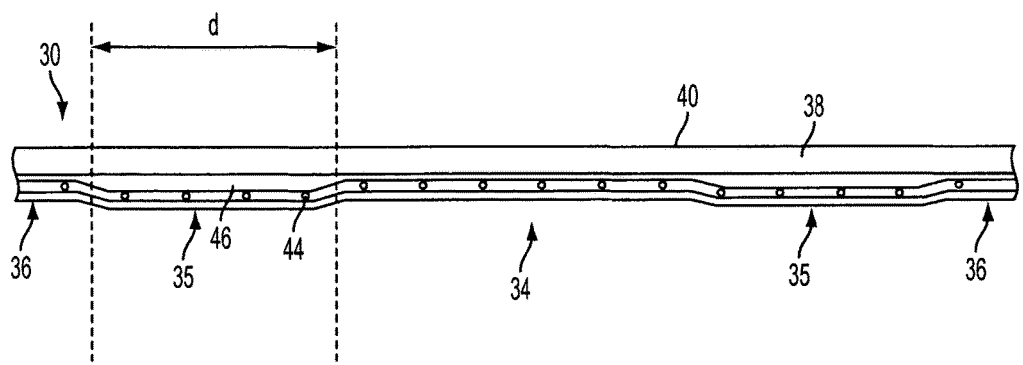
FIG. 3 is a partial cross-section of a mould for a wind turbine component according to the invention.
Figure 4:
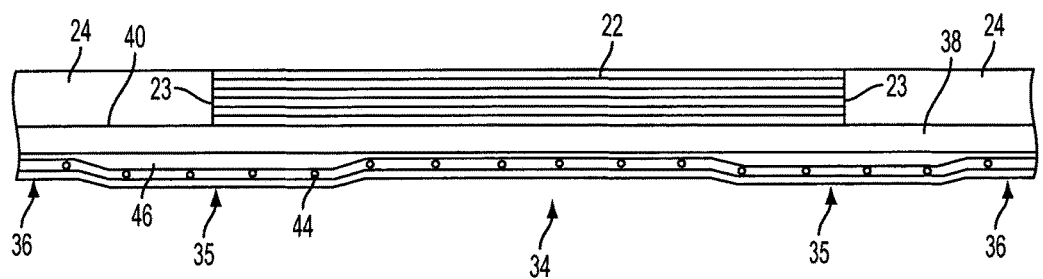
FIG. 4 is a partial cross-section of the mould of FIG. 3 in use in moulding a wind turbine blade.

FIGS. 3 and 4 are cross sections of the mould 30, taken across a first region 34 and two second regions 36, and hence taken across two transition regions 35. The cross-sections reveal that the mould 30 is made up of a plurality of mould layers. An inner mould layer 38 defines a mould surface 40 for supporting and moulding the blade 10. A layer of electrical heating elements 44 is arranged beneath the inner mould layer 38. Between the electrical heating elements 44 and the inner mould layer 38 is a heat distribution layer 46.

The heat distribution layer 46 is of varying thickness. In the transition regions 35 of the mould 30, the heat distribution layer 46 is relatively thick, while in the first and second regions 34, 36 of the mould 30, the heat distribution layer 46 is relatively thin.

Figure 5:
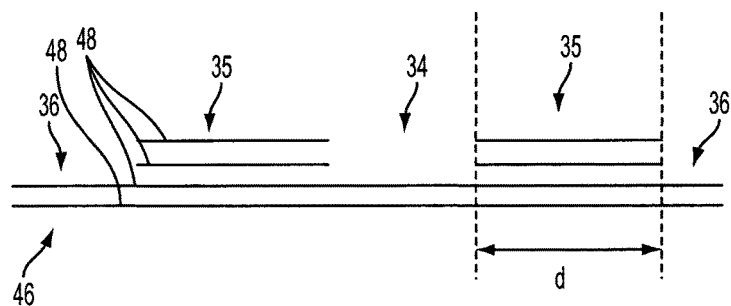
FIG. 5 is a partial cross-section of a heat distribution layer of the mould of FIGS. 3 and 4.

Referring now to FIG. 5, the heat distribution layer 46 is formed from a plurality of mesh layers 48. The heat distribution layer 46 comprises a greater number of mesh layers 48 in the transition regions 35 of the mould 30, than in the first and second regions 34, 36 of the mould 30. In other words, the heat distribution layer 46 is thicker beneath the boundary 23 than it is beneath the foam panels 24 or the spar cap 22. In the example illustrated, the heat distribution layer 46 comprises four mesh layers 48 in the transition region 35, and two mesh layers 48 in the first and second regions 34, 36, such that the heat distribution layer 46 is twice as thick in the transition region 35 as in the first and second regions 34, 36.

Each mesh layer 48 is made from a mesh of a heat-conducting material, in this case aluminium. Alternatively, the mesh layers 48 may be made from other suitable heat-conducting materials such as copper or a carbon fibre composite. The mesh layers 48 may be between 0.25 mm and 2 mm thick. The mesh density is typically around 20% dense (i.e. 20% of each mesh layer 48 comprises the heat-conducting material, and 80% of the mesh layer 48 is empty space).

Referring back to FIG. 4, when the mould 30 is in use it supports and moulds a half shell of a blade 10.

To form the half shell, the elements of the half shell are laid-up on the mould surface 40 of the inner mould layer 38. First, a gel coat is applied to the mould surface 40, and one or more fibre cloths that will form the outer skin of the half shell (not shown) are laid on top of the gel coat.

The spar caps 22 are then laid in place on the first regions 34 of the mould 30, and the foam panels 24 are laid in place on the second regions 36 of the mould 30. In this way, the boundaries 23 between the spar caps 22 and the foam panels 24 lie above the transition regions 35 of the mould 30. As shown in FIG. 4, the transition regions 35 of the mould 30 extend a short distance beneath the spar caps 22, and a short distance beneath the foam panels 24, such that the transition regions 35 have a width d, which is approximately 100 mm.

A fibre cloth that will form the inner skin of the half shell is then laid over the elements in the mould 30. The components of the half shell are then infused with resin, and the mould 30 is heated until the resin has reached the required curing temperature $T_{cure}$ throughout the lay-up.

To heat the mould 30, an electrical current is generated in the heating elements 44. Heat from the heating elements 44 is conducted to the adjacent heat distribution layer 46, and then to the inner mould layer 38 and the mould surface 40.

During heating, the heat distribution 46 layer performs two functions. Firstly, by virtue of the relatively high conductivity of the material of the heat distribution layer 46, heat is easily conducted within the heat distribution layer 46. This ensures that heat is quickly distributed around the mould 30, speeding up the curing process.

Secondly, by virtue of its varying thickness, the heat distribution layer 46 distributes the heat differently according to the mould regions 34, 35, 36 of the mould 30.

Because the spar caps 22 are of higher heat capacity than the foam panels 24, the spar caps 22 act as heat sinks, absorbing more heat energy than the foam panels 24. Heat therefore tends to flow from the second regions 36 of the mould 30 to the first regions 34 of the mould 30. This heat flow is facilitated by the heat distribution layer 46, which is of greater thickness in the transition regions 35 of the mould 30 than in the first and second regions 34, 36 of the mould 30.

The configuration of the heat distribution layer 46 therefore increases the rate at which heat is conducted from the second regions 36 to the first regions 34, so that heat flow towards the spar caps 22 is enhanced. This compensates for the difference in the respective heat capacities of the spar caps 22 and the foam panels 24, so that when the spar caps 22 reach the curing temperature $T_{cure}$ (for example, 60° C. to 120° C.) the foam panels 24 have not exceeded the maximum safe exposure temperature $T_{max}$ (for example, 120° C. to 150° C.).

Thus, the foam panels 24 do not heat beyond the safe exposure temperature $T_{max}$, which reduces the chances of structural damage to the foam panels. The curing process is also more energy-efficient than in known moulds.

Furthermore, as a steady state is achieved, the heat distribution layer 46 is able to accommodate the different thermal conductivities of the spar caps 22 (which will have a relatively high thermal conductivity) and the foam panels 24 (which will have a relatively low thermal conductivity) serving to distribute heat to maintain the appropriate temperature control.

Figure 6:
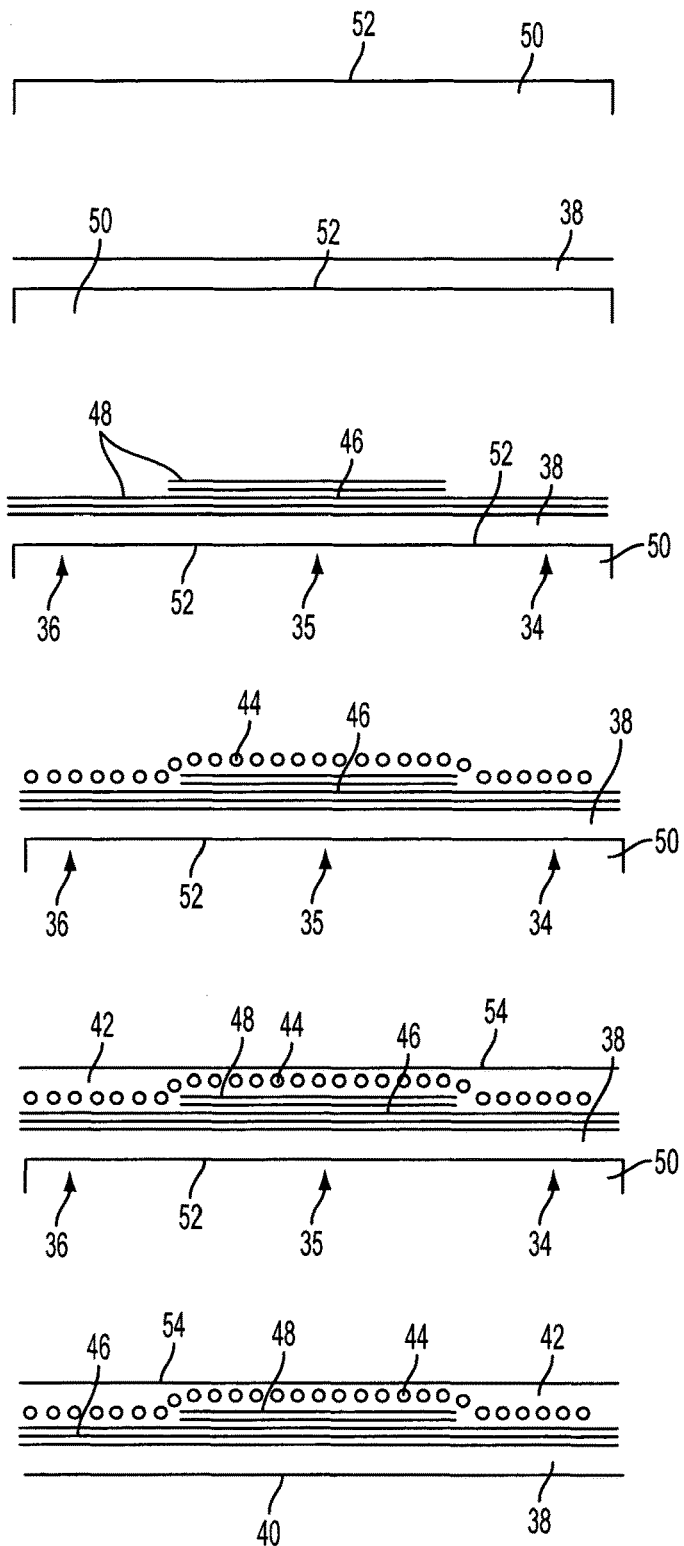
FIG. 6 illustrates a method of making the mould of FIGS. 3 and 4.

To make the mould 30, as shown in FIG. 6, a master plug 50, defining an outer surface 52 that mimics the outer surface of the half-shell to be moulded is provided. The outer surface 52 of the plug 50 is firstly prepared for moulding by applying a gel coat and a glass fibre tissue layer (not shown). The inner mould layer 38 is then laid-up on the outer surface 52 of the master plug 50: layers of glass fibre and carbon fibre are laid on the outer surface 52, the fibre layers are infused with resin, and the components are partially pre-cured.

Next, the heat distribution layer 46 is laid on the inner mould layer 38. The first two mesh layers 48 are laid over the first, second and transition regions 34, 35, 36 of the mould 30. Additional mesh layers 48 are then laid over the transition regions 35 only, so that the heat distribution layer 46 is of greater thickness in the transition region 35 than in the first and second regions 34, 36.

Each heating element 44 is then laid on the heat distribution layer 46. To this end, a length of cable that forms each heating element 44 is laid on the heat distribution layer 46 and is arranged in a serpentine manner into rows that extend back and forth across the mould 30, spanning the area of a heating control zone 26. A thin glass fibre tissue layer 54 is arranged over the heating elements 44, and the various components are then infused with resin. The mesh structure of the heat distribution layer 46 facilitates this infusion as the resin is able to infiltrate the open spaces in the mesh 48 to surround the components. Next, the components are partially pre-cured by heating.

The mould 30 is then removed from the master plug 50, and a final curing stage takes place to cure the mould 30 fully. In this final curing stage, the heating elements 44 which are included in the mould 30 are used to pulse-cure the mould 30. In this way, the heat distribution layer 46 conducts heat around the mould 30 during the curing stage, thereby facilitating efficient curing of the components. Once fully cured, the mould 30 is ready for use in moulding a wind turbine blade 10.

When the mould 30 is in use and is heated to cure a half shell of a blade, the rate Q at which heat flows across the transition regions 35 from the second regions 36 to the first regions 34 is given by Equation 1 below:

$$Q = Ak \frac{T_{max} - T_{cure}}{\frac{d}{4}} \qquad \text{Equation 1}$$

where A is the cross sectional area of the heat distribution layer 46 perpendicular to the heat flow direction, k is the thermal conductivity of the heat-conducting material of the heat distribution layer 46 in the transition region 35, $T_{max}$ is the maximum safe exposure temperature of the foam panels 24, $T_{cure}$ is the curing temperature of the resin, and d is the width of the transition region 35 (see FIG. 3).

For successful operation of the mould, this heat flow rate Q across the transition region 35 must be higher than the power $P_{transition}$ required to heat the transition region 35 of the heat distribution layer 46, which is given by Equation 2 below:

$$P_{transition} = P_{cable} d/X \qquad \text{Equation 2}$$

where $P_{cable}$ is the power supplied to a cable that forms the heating elements 44, d is the width of the transition region 35 and X is the pitch of the cable (i.e. the spacing between adjacent rows of the laid cable).

To ensure that the heat flow rate Q across the transition region 35 is sufficient to meet this criteria, the heat flow rate Q can be increased by forming the mesh layers 48 from a material of greater thermal conductivity k, and/or by increasing the cross-sectional area A of the heat distribution layer 46 perpendicular to the heat flow direction. The cross-sectional area A may be increased by increasing the thickness of the layer 46, and/or by increasing the mesh density in cases where the heat distribution layer 46 is a mesh. The width d of the transition region 35 may also be varied to control both the heat flow rate and the power $P_{transition}$ to the transition region 35.

Thus, the properties of the heat distribution layer 46 can be tailored to specific requirements of the blade 10 to be moulded in the mould 30.

As has been described, the heat flow rate Q across the transition region(s) 35 is affected by the cross sectional area A of the heat distribution layer 46 in a plane perpendicular to the heat flow direction (i.e. by the thickness or mesh density of the heat distribution layer 46), and by its thermal conductivity.

Thus, in other embodiments of the invention, the different regions 34, 35, 36 of the mould 30 may include a heat distribution layer 46 that is of constant thickness, but that is of varying mesh density, or of varying material, in the different regions.

Figure 7A:
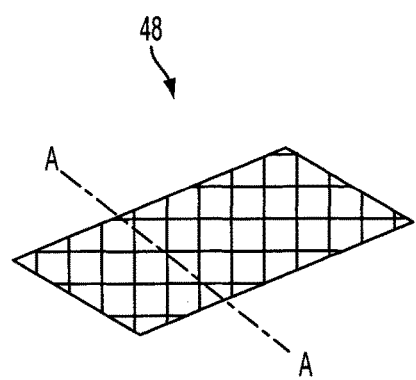
FIGS. 7a and 7b are perspective views of mesh layers of the heat distribution layer of FIG. 5.
Figure 7B:
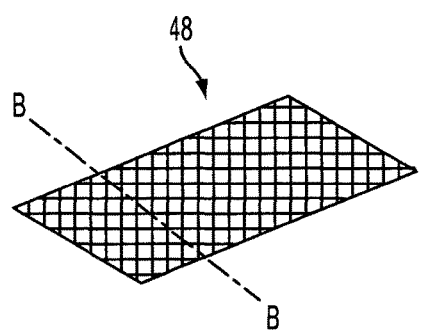
Figure 7C:
FIGS. 7c and 7d are cross-sections of the mesh layers of FIGS. 7a and 7b along the lines A-A and B-B respectively.
Figure 7D:

In one embodiment, mesh layers 48a, 48b of different mesh densities are used in the different regions 34, 35, 36. Mesh layers 48a of relatively low mesh density, illustrated in FIGS. 7a and 7c, are used in the first and second regions 34, 36, and mesh layers 48b of relatively high mesh density, illustrated in FIGS. 7b and 7d, are used in the transition regions 35. In this way, and as can be seen from comparison of FIGS. 7c and 7d, the mesh 48b of higher mesh density in the transition region 35, is of greater cross-sectional area A perpendicular to the heat flow direction than the mesh 48a of lower mesh density and the same thickness in the first 34 and second 36 regions of the mould 30. Thus, heat flows across the transition regions 35 from the second regions 36 to the first regions 34, as has been described.

In another embodiment, mesh layers 48 of different materials having different thermal properties are used in the different regions 34, 35, 36. The materials are selected such that the material of the mesh layers 48 in the transition region 35 is of greater thermal conductivity than the material of the mesh layers 48 in the first and second regions 34, 36. Mesh layers 48 made from a material of relatively high thermal conductivity, such as copper, are used in the transition regions 35, and mesh layers 48 made from material of relatively low thermal conductivity, such as aluminium, are used in the first and second regions 34, 36. Thus, the heat distribution layer 46 is of greater thermal conductivity in the transition regions 35 than in the first and second regions 34, 36, and heat flows across the transition regions 35 from the second regions 36 to the first regions 34, as has been described.

In other embodiments of the invention, any combination of the thickness, mesh density and/or material of the heat distribution layer 46 may be varied across the regions 34, 35, 36 of the mould 30.

Embodiments of the invention are also envisaged in which the heat distribution layer 46 is of greater thickness and/or of greater mesh density, and/or is made of a material having a greater thermal conductivity in the first region 34 of the mould 30 as well as in the transition region 35 of the mould 30.

Figure 8:
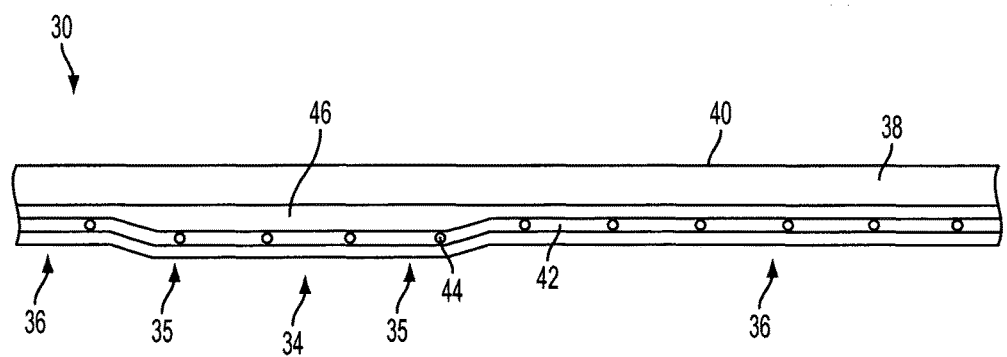
FIG. 8 is a partial cross-section of an another embodiment of a mould according to the invention.
Figure 9:
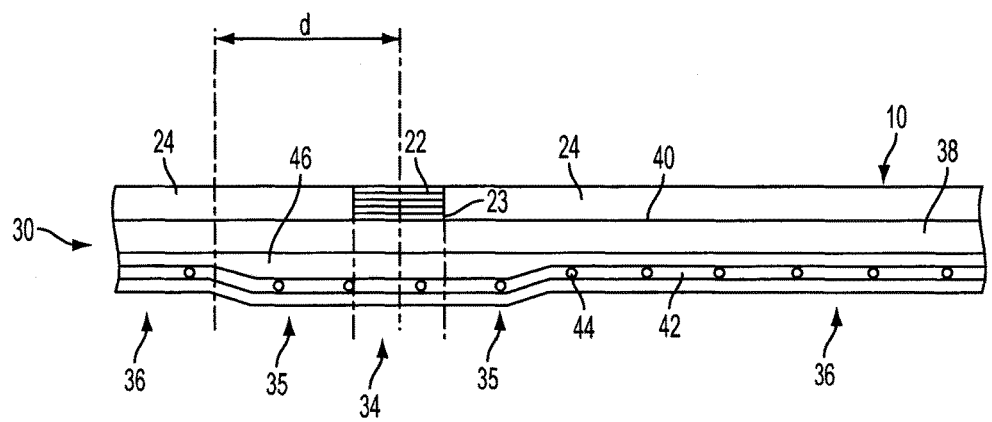
FIG. 9 is a partial cross-section of the mould of FIG. 8 in use in moulding a wind turbine blade.

An example of such an embodiment is illustrated in FIGS. 8 and 9, in which the heat distribution layer 46 is of greater thickness in the first region 34 of the mould. In this embodiment, the width d of the transition region 35 is increased such that neighbouring transition regions 35 meet. The transition region 35 therefore extends into the first region 34 of the mould 30, such that the heat distribution layer 46 is of greater thickness beneath the entirety of the spar cap 22, as is best seen in FIG. 9.

It will be appreciated that while the specific embodiments described relate to moulds for a wind turbine blade, the mould could be a mould for any component that comprises elements having different heat capacities.

Although in the embodiments described the heating means are in the form of electrical heating elements, the heating means may be any suitable means. For example, the heating means may be provided in the form of pipes through which a heated fluid such as water or oil may flow to heat the mould.

Any number of mesh layers of any appropriate thickness may be used in the heat distribution layer. The mould may additionally comprise further regions in which the heat distribution layer is of a third, different thickness or mesh density, or thermal conductivity. The mould may also comprise further regions in which the heat distribution layer is not present.

In the embodiments described the mould layers are laid-up as dry fibre layers and subsequently infused with resin. However, it will be appreciated that the mould layers may alternatively be pre-preg layers, and the resin infusion step may be omitted.

Although in the method of making the mould described above the heat distribution layer is arranged on the inner mould layer and the heating elements are arranged over the heat distribution layer, it will be appreciated that the arrangement of the heating elements and the heat distribution layer may be reversed, such that the heating elements are arranged on the inner mould layer and the heat distribution layer is arranged over the heating elements. In some instances, the heat distribution layer may be added in a separate process stage altogether, or, in moulds not forming part of the present invention, may be omitted.

It will be appreciated that many other variations of the invention are envisaged that fall within the scope of the following claims.

The invention claimed is:

1. A mould for a wind turbine component, the component comprising a plurality of elements having different respective heat capacities and the mould comprising:
an inner mould layer defining a mould surface for supporting the plurality of elements;
heating means disposed beneath the mould surface; and
a heat distribution layer adjacent to the heating means;
wherein the mould has one or more first regions configured to support elements of the component having relatively high heat capacity, one or more second regions configured to support elements of the component having relatively low heat capacity, and one or more transition regions defined between the first and second regions; and
wherein the heat distribution layer is of greater thickness and/or has a higher mesh density in the one or more transition regions of the mould than in the one or more second regions of the mould, and
wherein the heat distribution layer in one or more transition regions of the mould is configured to enhance heat transfer within the heat distribution layer to one or more first regions of the mould.

2. The mould of claim 1, wherein, in use, the transition region of the mould lies beneath a boundary between an element of the component of relatively high heat capacity and an element of the component of relatively low heat capacity.

3. The mould of claim 1, wherein the heat distribution layer is of greater thickness and/or has a higher mesh density in the one of more transition regions of the mould than in the one or more first regions of the mould.

4. The mould of claim 1, wherein the heat distribution layer is of greater thickness and/or has a higher mesh density in the one of more of the first regions of the mould than in the one or more of the second regions of the mould.

5. The mould of claim 1, wherein the heat distribution layer is of substantially the same thickness and/or has substantially the same mesh density in one or more first regions of the mould and in one or more transition regions of the mould.

6. The mould of claim 1, wherein the mould comprises a plurality of heating control zones, each heating control zone comprising a separately controllable heating means, and wherein a first region, a second region and a transition region of the mould are located in the same heating control zone.

7. The mould of claim 1, wherein the heat distribution layer comprises a plurality of sub-layers.

8. The mould of claim 7, wherein the heat distribution layer comprises a greater number of sub-layers in one or more of the transition regions of the mould than in one or more of the second regions of the mould.

9. The mould of claim 1, wherein the heat distribution layer comprises one or more mesh layers.

10. The mould of claim 1, wherein the heat distribution layer is at least partially made of aluminium.

11. The mould of claim 1, wherein the heating means comprises electrical heating elements.

12. The mould of claim 1, wherein the heating means is embedded in the mould.

13. The mould of claim 1, wherein the mould comprises one or more further regions in which the heat distribution layer is not present.

14. The mould of claim 1, wherein the component is a wind turbine blade.

15. The mould of claim 1, wherein the elements of the component of relatively high heat capacity are made of a carbon-containing material.

16. The mould of claim 15, wherein the elements of the component having relatively high heat capacity are longitudinally-extending reinforcement members.

17. The mould of claim 1, wherein the elements of the component having relatively low heat capacity are relatively lightweight core material such as foam and/or balsa elements.

18. A method of making a mould for a wind turbine component, the component comprising a plurality of elements having different respective heat capacities, the mould having one or more first regions configured to support elements of the component having relatively high heat capacity, one or more second regions configured to support elements of the component having relatively low heat capacity, and one or more transition regions defined between the first and second regions, and the method comprising:

a. providing a master plug defining an outer surface;
    b. arranging fibrous material on the outer surface of the master plug to form an inner mould layer of the mould;
    c. arranging a heating means and a heat distribution layer over the fibrous material, the heat distribution layer in a transition region of the mould being configured to enhance heat transfer within the heat distribution layer to a first region of the mould;
    d. integrating the inner mould layer, the heating means and the heat distribution layer to form the mould; and
    e. separating the mould from the master plug.

19. The method of claim 18, wherein the heat distribution layer is of greater thermal conductivity and/or is of greater thickness and/or has a higher mesh density in the transition region of the mould than in the second region of the mould.

20. The method of claim 19, wherein the heat distribution layer is of greater thermal conductivity and/or is of greater thickness and/or has a higher mesh density in one or more first regions of the mould than in one or more second region of the mould.

21. The method of claim 20, wherein the heat distribution layer is of substantially the same thermal conductivity and/or is of substantially the same thickness and/or has substantially the same mesh density in one or more first regions of the mould and in one or more transition regions of the mould.

22. The method of claim 18, comprising arranging a plurality of separately controllable heating means over the fibrous material, each heating means defining a heating control zone of the mould.

23. The method of claim 22, comprising arranging the heat distribution layer such that a first region, a second region and a transition region are disposed in the same heating control zone.

24. The method of claim 18, further comprising supplying resin to the fibrous material between steps (b) and (c) in a resin infusion process.

25. The method of claim 18, further comprising heating the inner mould layer between steps (b) and (c) to cure the resin.

26. The method of claim 18, wherein the heat distribution layer comprises a plurality of sub-layers, and the method comprises arranging more sub-layers of the heat distribution layer in one or more of the transition regions than in one or more of the second regions.

27. The method of claim 18, wherein step (d) comprises supplying resin to the layers in a resin infusion process.

28. The method of claim 18, wherein step (d) comprises heating the layers to cure the resin.

29. The method of claim 28, comprising heating the layers using the heating means.

30. A mould for a wind turbine component made according to the method of claim 18.

31. A method of making a wind turbine component using the mould of claim 1, wherein the method comprises:

arranging one or more first elements of the component having relatively high heat capacity in one or more first regions of the mould;
    arranging one or more second elements of the component having relatively low heat capacity in one or more second regions of the mould;
    forming a sealed region around the elements;
    reducing a pressure in the sealed region;
    optionally, supplying resin to the sealed region; and
    heating the mould using the heating means of the mould to cause a net heat flow towards the first elements of the component, wherein the heat flow towards one or more of the first elements is enhanced by the configuration of the heat distribution layer in one or more transition regions of the mould.

32. The method of claim 31, wherein the component is a wind turbine blade.

33. A mould system, comprising:

a wind turbine component having a first element with a first heat capacity and a second element with a second heat capacity, the second heat capacity being lower than the first heat capacity; and
    a mould comprising:
        an inner mould layer defining a mould surface for supporting the plurality of elements;
        heating means disposed beneath the mould surface; and
        a heat distribution layer adjacent to the heating means;
    wherein the mould has a first region configured to support the first element of the component, a second region configured to support the second element of the component, and a transition region defined between the first and second regions; and
    wherein the heat distribution layer in the transition region of the mould is configured to enhance heat transfer within the heat distribution layer to the first region of the mould.

* * * * *